Sept. 10, 1957  W. R. HEFFERNAN  2,805,664
TYING DEVICE
Filed Sept. 11, 1953  7 Sheets-Sheet 1

INVENTOR:
WILLIAM R. HEFFERNAN.
BY
*Charles A. Harris*
ATTORNEY.

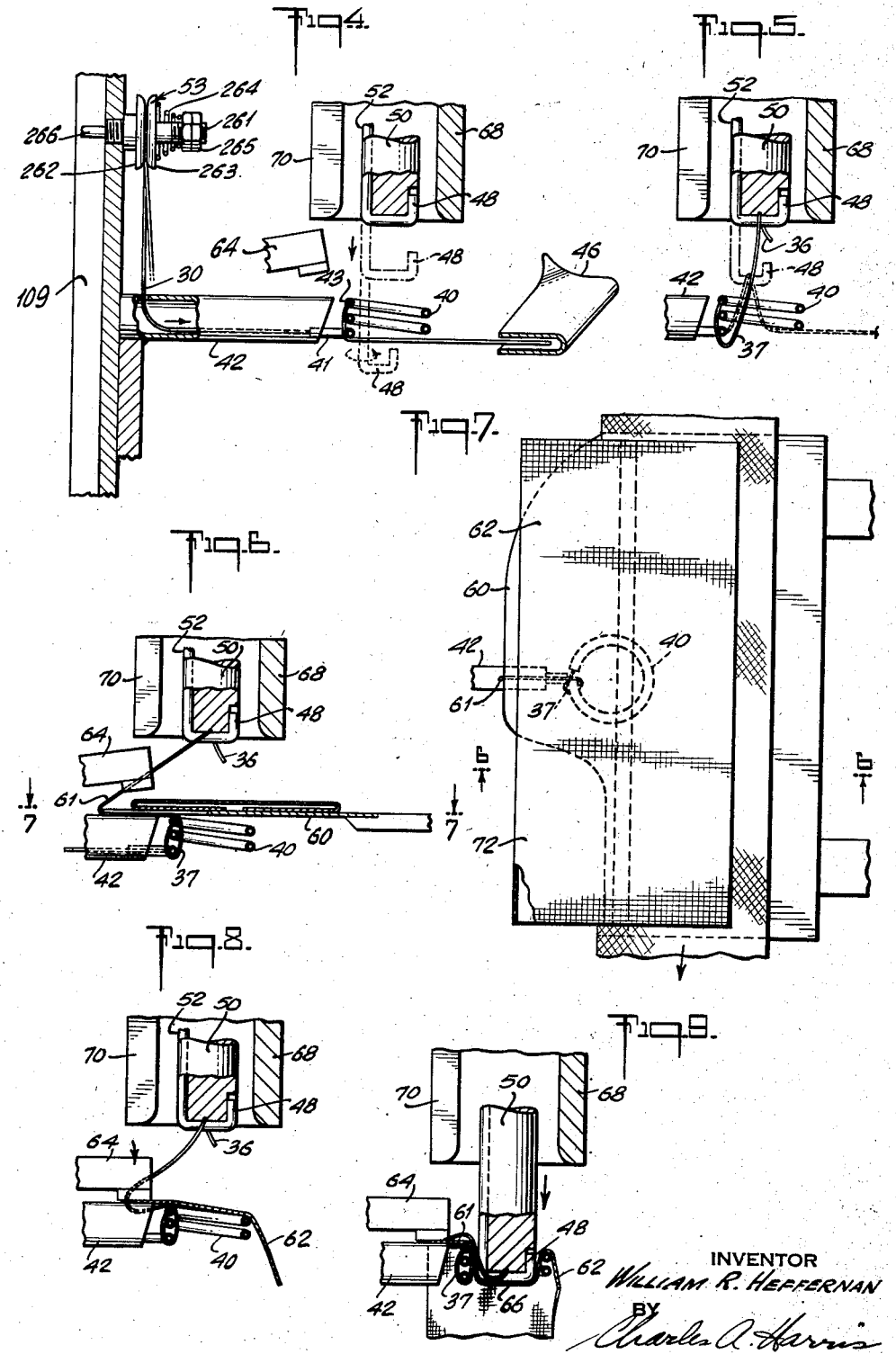

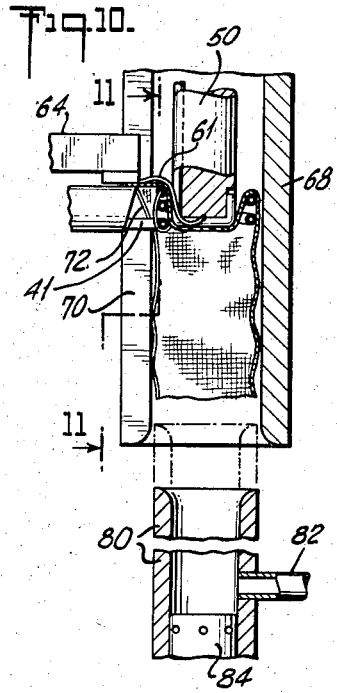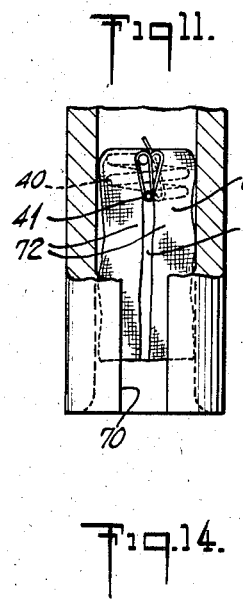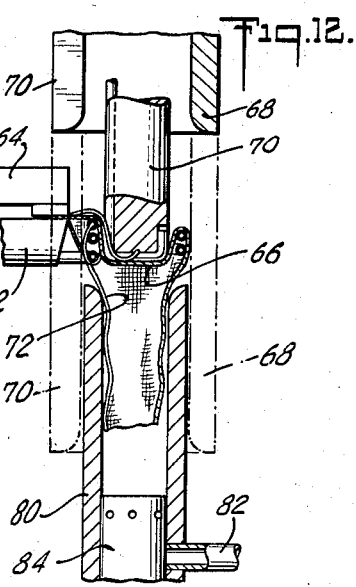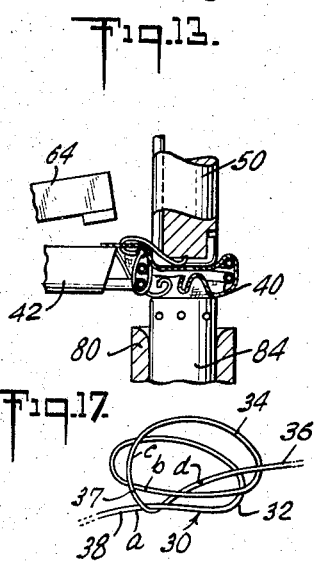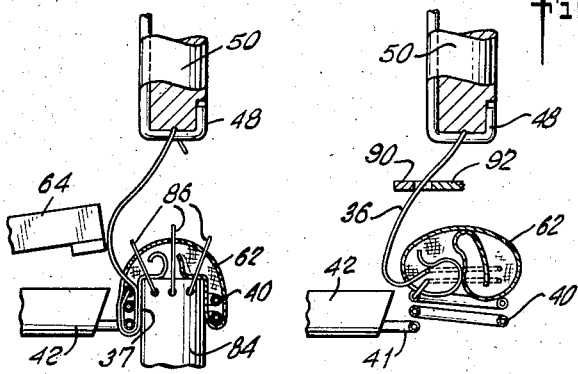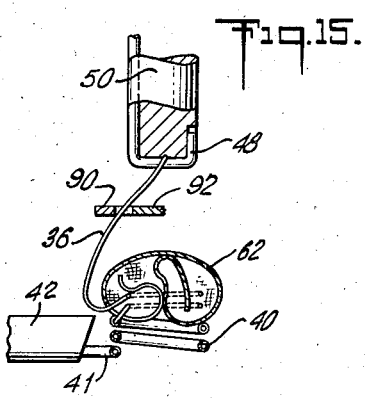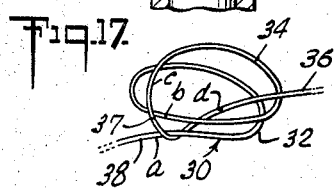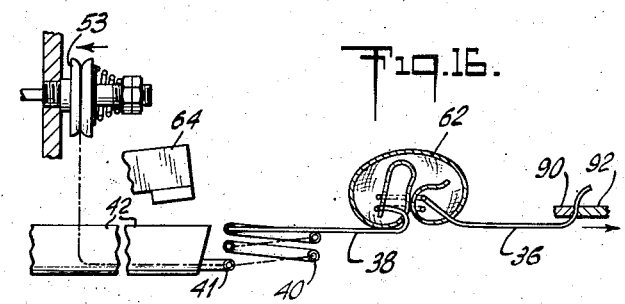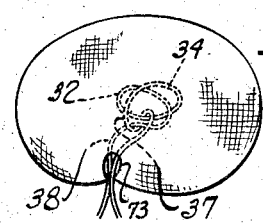

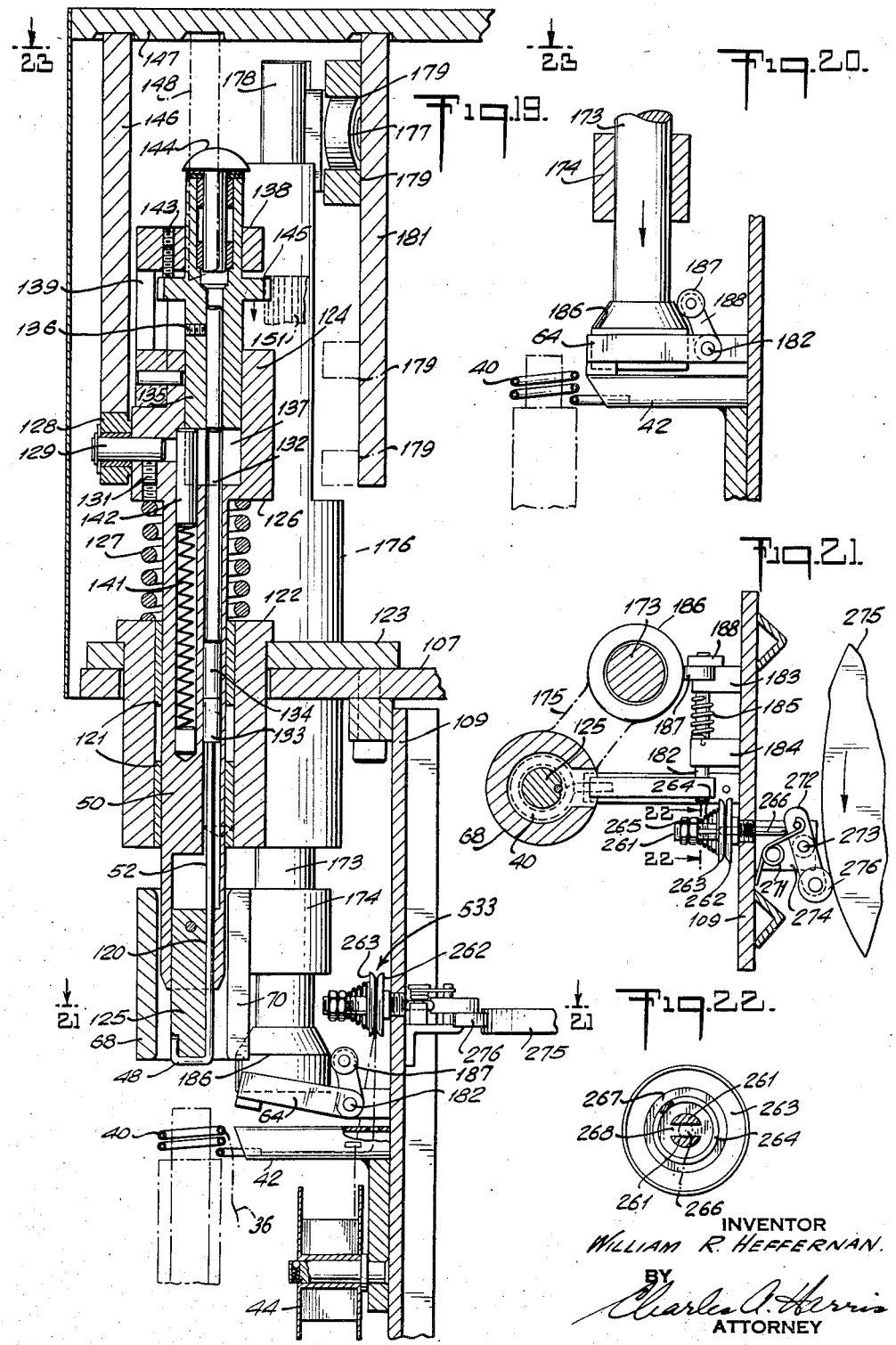

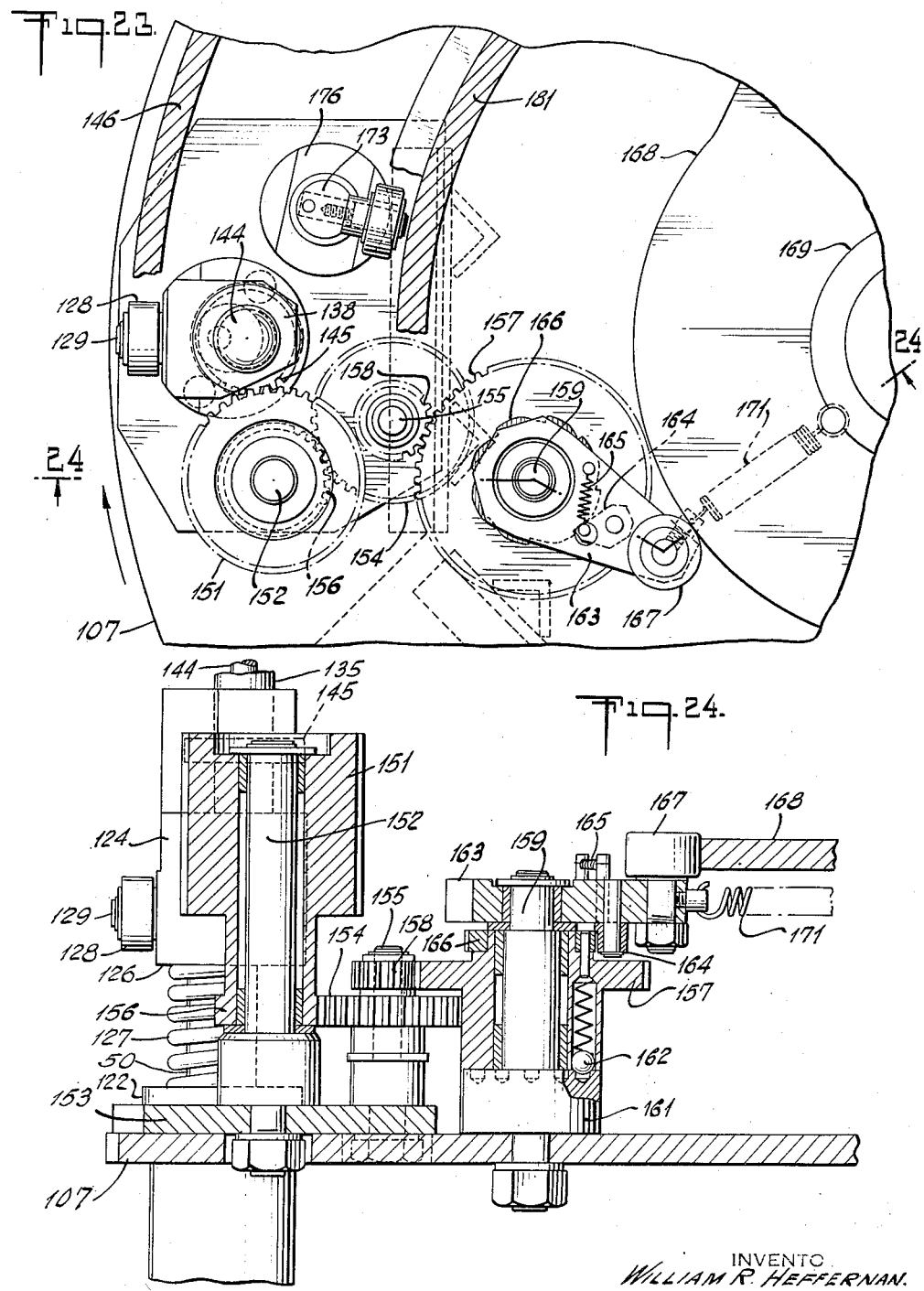

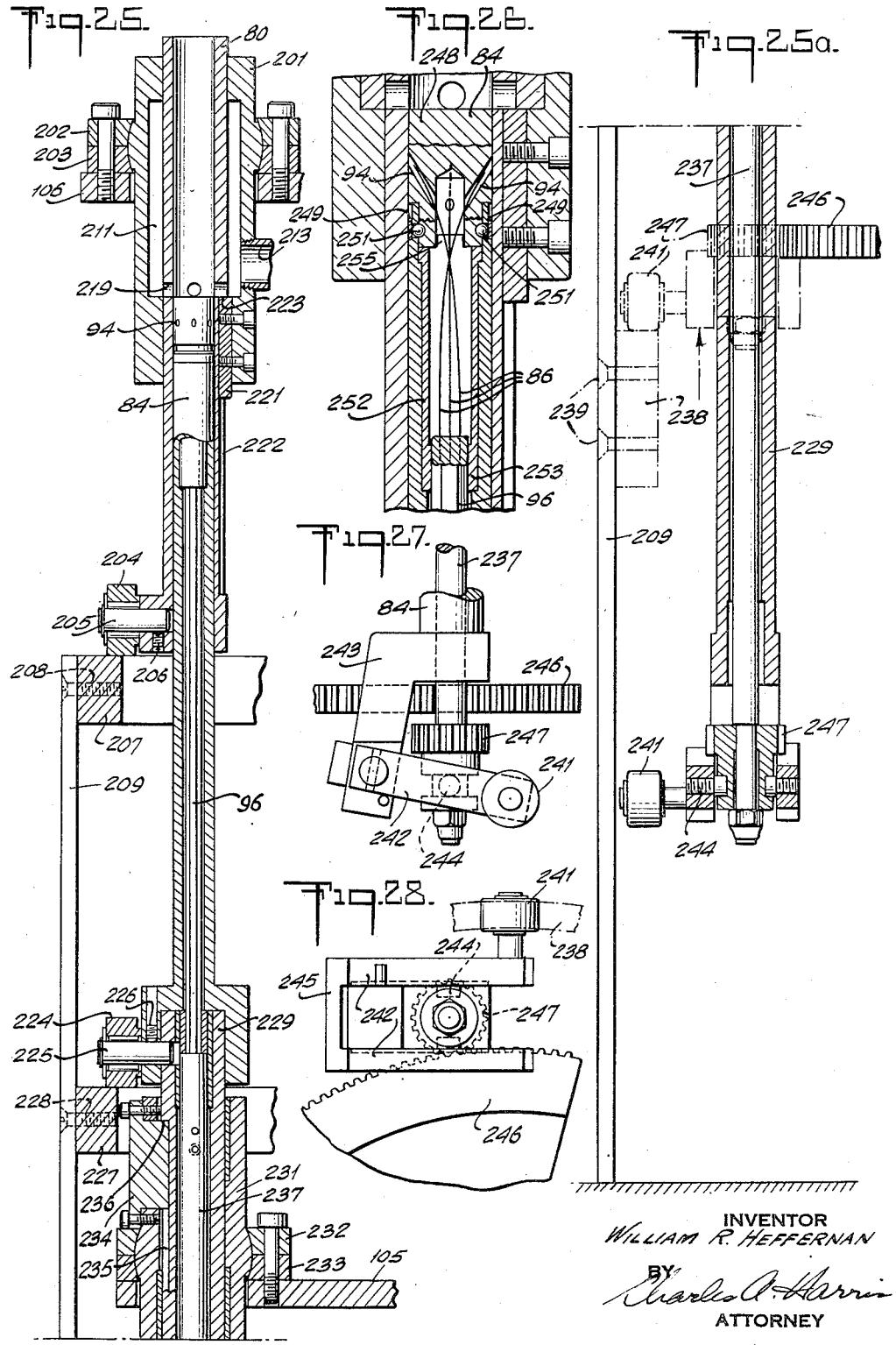

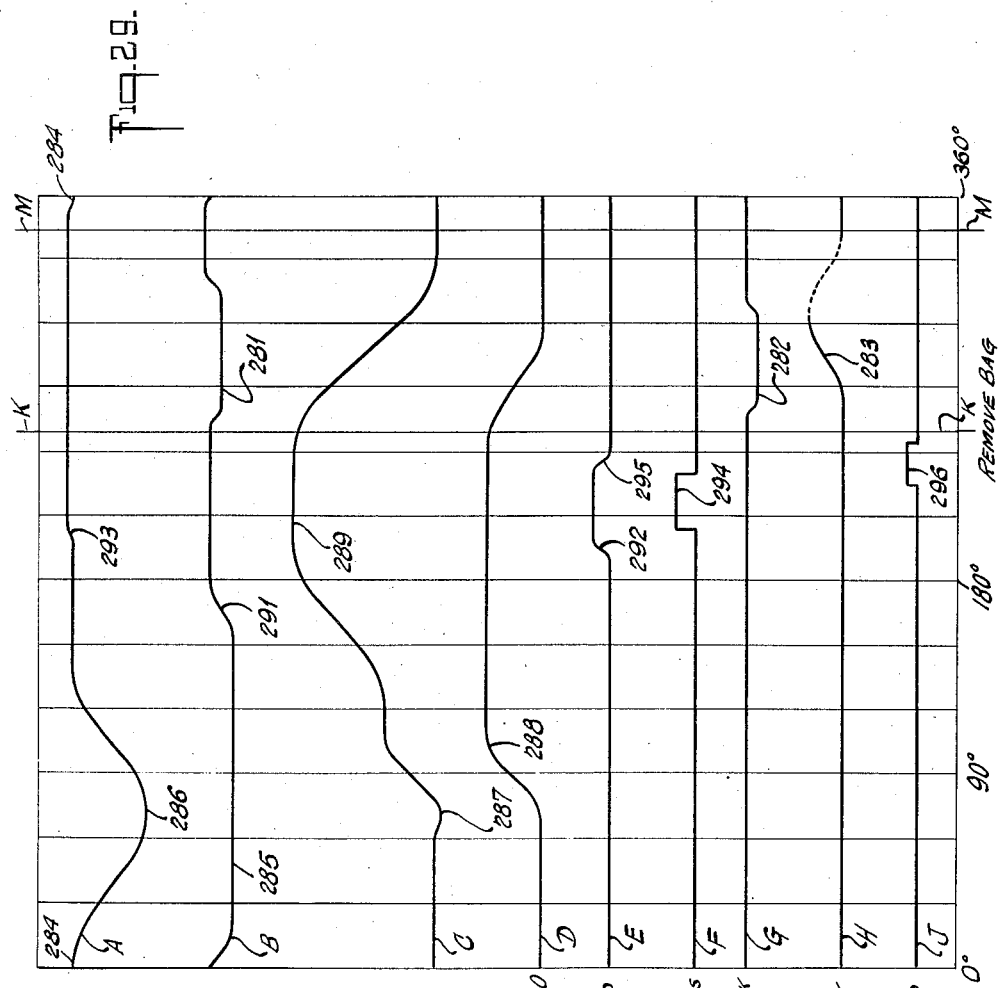

United States Patent Office 2,805,664
Patented Sept. 10, 1957

2,805,664

TYING DEVICE

William R. Heffernan, Westfield, N. J., assignor to Johnson & Johnson, a corporation of New Jersey Application September 11, 1953, Serial No. 379,709

19 Claims. (Cl. 128—296)

The present application is a continuation in part of my copending application, Serial No. 178,407/1950, filed August 9, 1950, and now abandoned. This invention relates to the forming, filling and closing or tying of bags. Its various aspects include a novel construction or arrangement of bag, a novel method of forming and tying such a bag which also is applicable to tying objects generally and to novel mechanism for performing such novel methods.

It has been proposed by others to make by automatic machinery small cloth bags filled with various materials and completely closed. Such bags are useful for many purposes, for example as infusors such as tea bags. Another form of bag has a more or less globular form and is filled with absorbent material such as cotton or gauze. This is particularly useful for surgical sponges. For the sake of example only, the invention will be described in connection with such sponges although the invention is not limited to sponges.

The surgical sponges of this type which have come to my attention have all been objectionable in various ways. Usually the bags forming the sponges have been sewed or tied from outside in such a way as to leave hard seams, sharp corners or tied necks which have made it impractical to use the sponges in sensitive wounds. Other forms of sponge have been secured together by cements or rubber which are objectionable in the sterilizating process to which the sponges must be subjected or are undesirable for other reasons.

One of the objects of my invention is to remove these disadvantages and to produce bags which are closed and tied positively with cord which is located wholly on the inside of the bag. Such a bag provides a firm, resilient, absorbent ball which has no seams, corners, knots nor hard spots on the outside, and which can be composed entirely of absorbent material such as cotton, and is devoid of rubber, cement and other objectionable material.

Another object is to provide a novel form of bag which is convenient and economical to make and to tie, and which can be readily formed and tied on automatic machinery.

Another object is to provide a simple and effective knot which can be tied readily by automatic machinery.

Another object is to provide an improved method of forming and knotting a tie which is applicable to tying objects generally and which can be performed by automatic machinery.

Another object is to provide simple and effective automatic machinery for making and tying bags, and for making and forming ties suitable for other objects.

Other objects and advantages of the invention will be apparent in the following description and in the accompanying drawings, in which:

Fig. 4 is an elevation, partly in section, of that portion of the apparatus of Fig. 1 which forms a cord into an incipient knot, and being shown at the initial stage of forming such incipient knot;

Fig. 5 is a view corresponding to Fig. 4, of a portion of the apparatus shown in Fig. 4 at a succeeding step in the formation of the incipient knot;

Fig. 6 shows the initial step in the formation of a bag which is to be tied by the knot;

Fig. 7 is a plan of a portion of the apparatus, being a section taken on the line 7—7 of Fig. 6, and showing the mechanism for placing the material of the bag in position to be formed into the bag;

Figure 1:
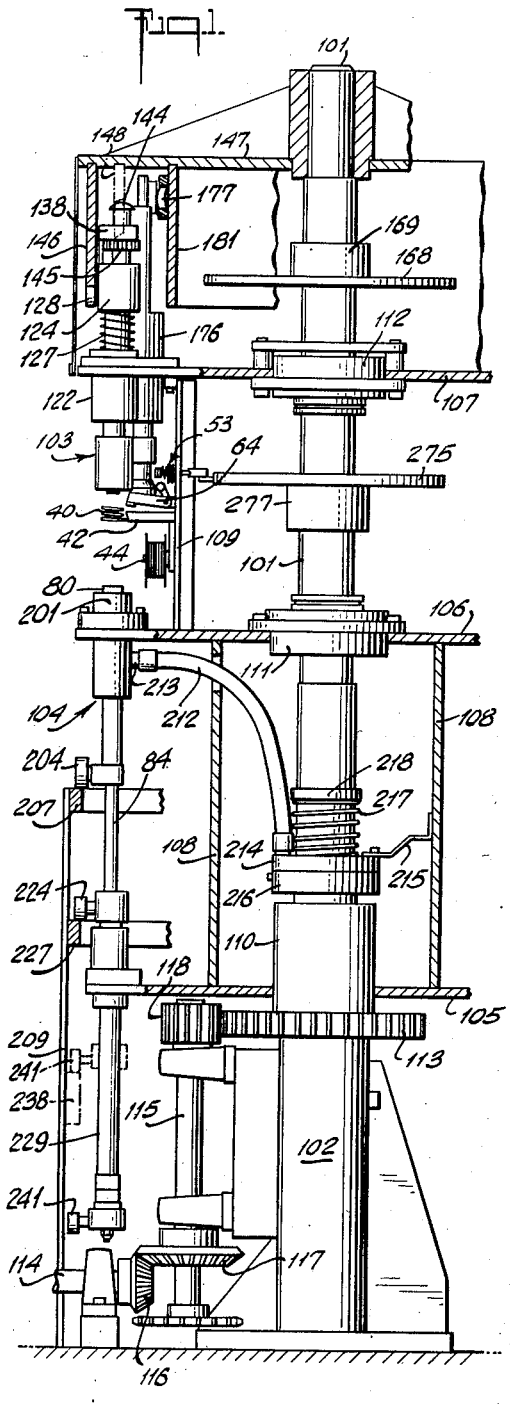
Fig. 1 is an elevation, partly in section, of one embodiment of the automatic apparatus of this invention.

Fig. 8 corresponds to Fig. 6 but shows the apparatus at the second step in the formation of the bag;

Fig. 9 shows the third step in the formation of the bag;

Fig. 10 shows the fourth step in the formation of the bag;

Fig. 11 is an elevation, partly in section on the line 11—11 of Fig. 10;

Fig. 12 shows the fifth step in the formation of the bag;

Fig. 13 shows the sixth step in the formation of the bag;

Fig. 14 shows the final step in the formation of the bag and the initial step in the removal of the bag from the machine;

Fig. 15 shows the second step in the removal of the bag from the machine;

Fig. 16 shows the third step in the removal of the bag from the machine and the completing of the knot, that is the conversion of the incipient knot into the tied or completed knot;

Fig. 17 is a perspective view of the cord arranged into an incipient knot;

Fig. 18 is a perspective view of a completed and tied bag, showing the arrangement of the cord which forms the knot;

Fig. 19 is an enlarged sectional view, partly in elevation, of the upper portion of one of the units of Fig. 1;

Fig. 20 is a view, partly in section and partly in elevation, of the cam for operating the string-holding clamp of Fig. 19;

Fig. 21 is a sectional view along the line 21—21 of Fig. 19;

Fig. 22 is an enlarged sectional view along the line 22—22 of Fig. 21;

Fig. 23 is a view, partly in plan and partly in section, showing the cam and mechanism for turning the hook of Fig. 19;

Fig. 24 is a sectional view along the line 24—24 of Fig. 23;

Fig. 25 is an enlarged view, partly in section and partly in elevation, of the top of the lower portion of one of the units of Fig. 1;

Fig. 25a is a similar view, partly in section and partly in elevation, showing the bottom of the same portion;

Fig. 26 is a still further enlarged sectional view, partly in elevation, showing the structure of the head of the piston of Fig. 25 and the needles of this invention in retracted position therein;

Fig. 27 is an elevation of the cam follower and gear arrangement for projecting and turning the needles of Fig. 26;

Fig. 28 is a partial plan view of the apparatus of Fig. 27;

Fig. 29 is a typical timing diagram for the apparatus of Fig. 1.

Tie forming and knotting

The invention includes a method of, and means for, forming and knotting a novel tie which is applicable to various objects, but which is particularly suited to closing bags.

Referring to Fig. 17 a cord 30, which may lead from any continuous supply, such as a spool, is formed into one or more, and preferably two, convolutions 32 and 34 which are coaxial and continuous one with the other. That is, one convolution continues into the next. The first convolution 32 extends from the point *a* to the point *b* and the second extends from the point *b* to the point *c*. The free end 36 of the cord is passed completely around both convolutions forming a loop 37 which surrounds the convolutions. The loop is the portion of the cord included between the point *c* and the point *d*.

When an object to be tied is placed within the convolutions and tension is applied to the cord as by holding the standing part 38 and pulling the free end 36, the convolutions close or tighten about the object and the loop closes or tightens about the convolutions, forming a secure knot. In this knot the standing part 38 of the cord is held securely by the loop 37 which in turn is held by the convolutions 32 and 34 which press the loop firmly against the article tied. A similar knot can be formed with a single convolution 32, but I prefer to use two convolutions as this fastens more securely the end of the loop which depends upon the convolution or convolutions to hold it in place.

Figs. 4, 5, and 19 illustrate one form of apparatus for forming the cord into convolutions and tying the knot shown in Fig. 17. A tube 40 is formed into a cylindrical helical coil having one or more, and preferably two, convolutions or turns. The lower end 41 of the tube is supported in any suitable support 42 which is preferably hollow, and the tube communicates with the interior of the support. The discharge end 43 of the tube is preferably located directly above the supported end 41. The cord 30 is led from any suitable supply spool 44 through the hollow support 42 and through the convolutions of the helical coil 40. The free end 36 of the cord comes out of the discharge end of the helical coil and falls down over the outside of the coil by gravity, as shown in Fig. 19. The coil constitutes means for positively holding the cord in the form of a helix having one or more convolutions. The end of the cord is then drawn diametrically across the coil and below its convolutions in any suitable manner, for example by a suction pipe 46 placed near the coil as shown in Fig. 4. A hook 48 is placed above the coil and in axial alignment with it as shown in Figs. 4 and 19. The hook is supported on a plunger 50 and is arranged to be slid along the plunger into and through the coil, taking the various positions illustrated in dotted lines in Fig. 4. The hook can also be rotated on its stem 52 to the foreshortened lowermost dotted line position in Fig. 4. After the cord has been drawn across the lower end of the coil, the hook is lowered through the coil below the cord, rotated to this position, and withdrawn from the coil, drawing the free end of the cord with the hook away from the suction pipe. The hook is then drawn tightly against the plunger 50, clamping the free end of the cord in the position shown in Fig. 5. In drawing the free end of the cord through the coil in this way, the loop 37 previously referred to is formed about the convolutions of the coil and thus about the convolutions of the cord held in the form of a helix.

The object to be tied is placed within the coil and the loop 37 is unscrewed from the helical coil. That is, the loop is maintained intact and is revolved about the axis of the coil. In this way the coil acts as a screw thread and the loop is progressively removed from the convolutions, like a nut. This draws more cord from the spool and draws cord linearly along the convolutions of the helix, and produces about the object to be tied the cord in the form of the convolutions of a helix surrounded by the loop, as shown in Fig. 17. Tension is then applied to the cord, for example by holding the standing end of the cord by any suitable known clamp or friction device 53 and pulling on the free end 36. This tightens the convolutions of the cord about the object to be tied and tightens the loop 37 about the convolutions, forming the knot described.

Bag forming and tying

The object to be tied may be placed within the coil either before or after the free end of the cord is passed through the coil, but where the object to be tied is the novel bag formed in accordance with the invention, the free end is preferably passed through before the bag is formed and inserted.

Figure 2:
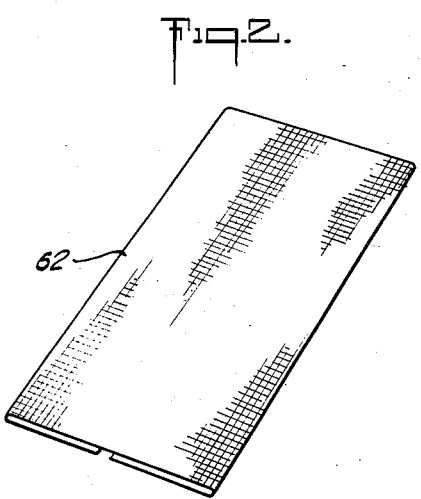
Fig. 2 is a perspective view of a piece of gauze folded preparatory to being placed in the machine of this invention.

Referring to Figs. 6 and 7, after the free end of the cord has been drawn through the helical coil and is clamped by the hook 48 against the rod 50, a plate 60 is passed between the helical coil and the hook. This pushes the cord to one side, drawing more cord through the helical tube and forming a bight 61. A sheet of cotton gauze 62 which has been folded as shown in Fig. 2 to avoid harsh or raveling side edges is laid on top of the plate. A clamp 64 is pressed down on the gauze and the plate is then withdrawn, leaving the gauze held between the clamp 64 and the tube support 42 (Fig. 8).

Figure 3:
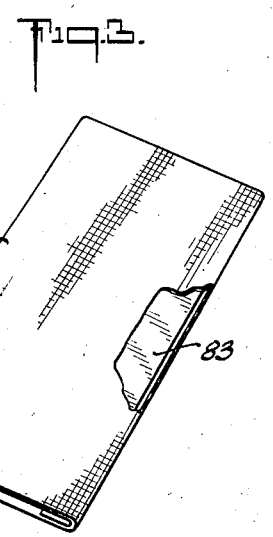
Fig. 3 is a perspective view of a similar folded piece of gauze, partly cut away to show filling material contained therein.

The plunger 50, carrying with it the hook 48, is then pushed down into the helical coil as shown in Fig. 9, forming the gauze into a small bag 66 within the coil. The remaining part of the gauze is folded down around the outside of the helical coil and may be stuffed into the bag as filler by apparatus about to be described. A tube 68 having a slit 70 to clear the clamp 64 and tube support 42 (Figs. 10 and 11) is pushed down around the coil and plunger 50, carrying and folding the ends and sides of the gauze into the generally tubular arrangement shown in Fig. 10. In so doing the tube 68 folds the left-hand folded portion 72 of the cloth (as depicted in Fig. 7) around the end 41 of the tube 40 and thus around the bight 61 of the cord, as shown in Figs. 10 and 11, because the center of this folded edge is held by the clamp 64. This provides a slit 73 into the bag through which the free end of the cord is led from the inside of the bag to the hook 48. Next a cylinder 80 having a suction connection diagrammatically represented in Figs. 10 and 12 by the tube 82 is pushed up into the tube 68. This sucks the ends of the gauze into the cylinder 80 as shown in Fig. 12. The tube 68 is then withdrawn. The cylinder 80 contains a piston 84 whose diameter is substantially less than the inside diameter of the helical coil. This piston 84 is now raised as shown in Fig. 13 and pushes the gauze contained in the cylinder 80 up inside the helical coil. As the piston 84 reaches the position shown in Fig. 13 the plunger 50 is withdrawn, the piston 84 being further raised to turn the bag 66 (originally formed by the plunger 50) inside out, forming a reentrant or inverted neck for the bag and filling the bag with the material recently contained within the cylinder 80, as shown in Fig. 14. This constitutes means for filling the bag with absorbent material. An important factor at this stage is the formation of the inverted neck inside the bag and inside the incipient knot. If the piece of gauze is short it will form only the neck of the bag, while if it is long the portion remaining after formation of the neck proper will act as filler. If desired the gauze may form the neck and bag only and separate filler may be inserted. As shown in Fig. 3, a sheet of absorbent material 83, such as tissue paper, may be folded inside the gauze 62 and thereafter treated as part of the gauze to form a gauze bag with absorbent filler.

The bag as a whole, carrying with it the convolutions of cord and the loop is then unscrewed from the helical coil. This is accomplished by impaling the bag on retractable needles 86 carried by the piston 84 (Fig. 14), releasing the clamp 64 and rotating the piston 84 and finally withdrawing the needles, leaving the bag as depicted in Fig. 15. As shown, the bag is completely formed, has its neck inverted and inserted in the bag, the remaining material of the gauze is stuffed inside the bag, the cord, formed into an incipient knot, is passed around the neck inside of the bag and the ends of the cord are led outside the bag through the slit 73. The bag is removed from the helical coil but is resting on top of it.

To complete the tie and knot, the string is simply pulled. One way of doing this is diagrammatically shown in Figs. 15 and 16. A cord gripper or clamp having a pair of separated jaws 90 and 92 is passed around the free end 36 of the cord, as shown in Fig. 15, the jaws are closed as shown in Fig. 16, the hook 48 is lowered slightly to release the free end of the cord, the clamp is pulled to the right as shown in Fig. 16, and the friction device 53 is set to oppose drawing more cord through the tube. This tightens the convolutions of the cord about the neck inside the bag and tightens the loop about the convolutions, gathering the neck and knotting the tie about it. The beginning of this tightening is illustrated in Fig. 16. When the tightening is complete a tied bag as shown in Fig. 18 results. The convolutions of the string and the loop forming the tie and knot are completely enclosed within the bag and the ends of the string pass outside the bag through the slit 73. One or both ends of the string may be left at a convenient length for handling the bag, or if preferred they may be cut off. If no string ends are wanted, the bag is compressed slightly and the ends are cut off close to the bag in any suitable known manner. The inherent resilience of the bag when released will withdraw the cut ends entirely within the bag. In any event the standing part of the string is cut off at a convenient length away from the helical coil, leaving a new free end 36 to be positioned by the suction pipe 46 to tie another bag.

Figs. 25 and 26 show the needle mechanism in the piston 84. The piston 84 has a number of diagonally bored holes 94 leading to its hollow interior. Slidably mounted in a non-circular bore in the plunger is a non-circular rod 96 in the end of which are rigidly secured a number of spring needles 86, slightly curved, of materially smaller diameter than the holes 94 and sufficiently resilient to pass through these holes into the position shown in Fig. 14 when the rod 96 is advanced in the piston 84. When the rod 96 is retracted, the needles are withdrawn into the piston 84, which then appears as shown in Figs. 13, 25, and 26. The invention includes mechanism for raising and lowering the piston 84 and for advancing and retracting the needle-carrying rod 96 and for rotating the end of the piston with its needles as described below.

*Automatic machine*

The invention includes mechanism for performing automatically the various operations above described, in appropriate timed relation. Referring to the drawings, in particular to Fig. 1, there is shown a vertical supporting shaft 101 fixedly mounted in a stationary base 102. To the left of the fixed shaft in Fig. 1 is shown a bag forming and knot tying unit comprising an upper portion 103 and a lower portion 104 which work together to perform the various operations described hereinbefore. The bag forming unit is mounted on the shaft 101 for rotation with respect thereto. An integral mounting structure is formed by the horizontal supporting disks 105, 106, and 107, each of which is rotatably mounted on the shaft 101. The disks 105 and 106 are connected by the hollow cylinder 108 and the disks 106 and 107 by a series of vertical supporting members 109. The lowermost disk 105 is mounted on the shaft 101 through a drive bushing 110 which is rotatably mounted on the shaft in a fixed vertical position, while the disks 106 and 107 are rotatably mounted on the shaft 101 through sleeves 111 and 112 containing ball bearings to facilitate their rotation. The lower portion of the bag-tying unit is supported by the disks 105 and 106 and the upper portion of the bag-tying unit 103 is supported by a vertical supporting member 109 and the disk 107, as will be described more fully hereinafter. The above described mounting structure and the bag-tying unit which it supports is driven about the vertical shaft 101 through the drive bushing 110 affixed to the bull gear 113. A source of power not shown is utilized to turn a drive shaft 114 which drives the intermediate shaft 115 through bevel gears 116 and 117. The rotation of the intermediate shaft, in turn, is transferred to the bull gear 113 by the spur gear 118 at the end of this shaft. The structure described is particularly adapted to support and drive several bag-tying units similar to the one shown in Fig. 1, and as will be apparent from the following description, the various cams controlling the automatic operation of this machine are designed with this in view.

The structure of an individual unit of one embodiment of this invention and the way in which its various parts act together automatically to perform the operations described hereinbefore in connection with Figs. 4 through 18, can best be described with reference to the timing diagram of Fig. 29, taken together with the remainder of the drawings. Generally speaking, the bag forming and knot tying unit of this invention is caused to operate automatically through connections between the various parts of the unit and corresponding cams and gear segments mounted in fixed positions with respect to the rotating unit. The operation of the various parts is timed by the location of these cams and gears with respect to the rotative cycle.

As described hereinbefore the stem 52 of the hook 48 is slidably mounted in the hook plunger 50, which in turn is supported for vertical movement along the axis of the helical coil 40 toward and away from the coil. The plunger 50 is slidably supported in bushings 121 carried by a sleeve 122 mounted in a take-up plate 123 bolted to the disk 107. The uppermost portion of the plunger 50 is enlarged to form a body portion 124 of greater diameter than the plunger and its lowermost portion 125 is smaller in diameter to fit within the coil 40. The body portion 124 forms a flange surface 126 with the main portion of the plunger such that a helical spring 127 positioned around the plunger and resting on the upper surface of the sleeve 122, will press upward against the flange 126 to provide vertical support for the plunger 50 and associated parts. Mounted on the side of the plunger body is a roller cam follower 128 rotatably mounted on a pin 129 fixed to the plunger body by a set screw 131. The stem 52 of the hook 48 is attached to a cam rod 132, slidably mounted in the plunger body, through screw connections 133 and 134 on corresponding ends of each of these parts. The opposite end of the stem 52 protrudes through the hook plunger through a close fitting hole 120 which acts as a bushing for the stem, while the opposite end of the cam rod 132 is secured to a cam follower housing 135 by a set screw 136. The cam follower housing 135, in turn, is slidably mounted for vertical movement in a recess 137 in the upper end of the plunger body. The upper portion of the housing fits through a collar 138 supported above the plunger body by means of a bar 139 connected to the latter. The housing 135 is urged upward against stop screws 143 mounted in the collar by a spring 141 seated in the plunger, which presses a rod 142 against the underside of the housing. Fixed to the top of the housing 135 is a mushroom-type cam follower 144 for extending the hook 48, and centrally located about the housing and integral therewith is a spur gear 145 for rotatinng the hook.

The plunger 50 is raised and lowered during rotation of the unit through contact between the cam follower 128 and a cylindrical cam 146 secured to a plate 147 fixedly mounted on the vertical supporting shaft 101. The cam 146 is continuous, corresponding with the cam diagram B of Fig. 29, and the roller 128 is held in continuous contact therewith by the spring 127. The hook 48 moves with the plunger 50 during the above described movement except during the time the hook cam follower 144 comes into contact with a fixed cam 148 which also is mounted on the plate 147. This cam, shown dotted in Figs. 1 and 19, is relatively short only in contact with the follower 144 during the dipped portion of cam diagram G of Fig. 29. During this time the cam 148 extends the hook with respect to the hook plunger by pressing the cam follower housing 135 downward against the action of the spring 141.

The hook 48 is turned to assume the lowermost position shown in Fig. 4 for picking up the string end 36 by rotating the cam follower housing 135 through contact between the teeth of the spur gear 145 and gear 151 of Figs. 23 and 24, also shown dotted in part in Fig. 19. The gear 151 is journaled on a fixed shaft 152 bolted to disk 107 through the plate 153 and its teeth extend axially such that they will remain in contact with the teeth of gear 145 during vertical movement of the plunger 50 and hook 48. Gear 151 is driven by an idler gear 154 mounted on a separate shaft 155, also bolted to the disk 107, through contact between the teeth of this gear and the teeth of a gear 156 of lesser diameter at one end of the gear 151. Gear 154 is driven by a gear 157 journaled on the fixed shaft 159, which in turn is bolted to the disk 107 through the widened base 161 of this shaft. Gear 157 turns gear 158 of still smaller diameter mounted on one end of gear 154. Gear 157, normally held against slippage by a spring loaded detent 162, is driven by a ratchet arm 163 having a dog 164 rotatively mounted on the arm and urged by a spring 165 into contact with the teeth of a ratchet wheel 166 fixed to the body of the gear. Driving motion is imparted to the ratchet arm 163, via a roller cam follower 167 mounted on one end of the arm 163, by a cam 168 secured to a bushing 169 fixedly mounted on the vertical supporting shaft 101. This cam, which is in continuous contact with the follower 167, is represented by cam diagram H of Fig. 29. The roller 167 is urged into contact with the surface of the cam by a spring 171, connected between the follower end of the arm 163 and a support, not shown, mounted on the disk 107. As shown in Fig. 23, the ratchet arm 163 will be urged clockwise by the rise on the cam and returned in a counterclockwise direction to its former position by the spring 171 after the rise has passed. The amount of clockwise movement imparted by the cam is just sufficient to turn the ratchet arm an amount equivalent to one tooth on the ratchet wheel 166. The gear ratio between gear 157 and gear 145 is such that movement of the ratchet wheel one tooth is equivalent to one full turn of the gear 145 and the hook 48.

The tube 68 is positioned to fit over the plunger 50 and the helical coil 40 and move vertically along the axis of the coil 40 to and from the position shown in Fig. 10. Tube 68 is fixedly supported to a shaft 173 through a sleeve 174 attached to the shaft and an arm 175 connecting the tube 68 to the sleeve. The shaft is slidably supported for vertical movement by bushings, not shown, carried by partial cylinder 176 which extends through the uppermost disk 107 and is fixed thereto. Shaft 173 is moved up and down by a roller cam follower 177 affixed to a flattened upper portion 178 of the shaft, and the cam follower is controlled in its movement by a cam track 179 extending around the outer surface of the cylindrical member 181 secured to the plate 147. The roller 177 rides in the track of this cam such that the shaft 173 and the tube 68 are continuously moved and supported by the cam. The shape of cam 179, and therefore the nature of the movement of tube 68, is represented by cam diagram A of Fig. 29.

The clamp 64 is also controlled by the motion of shaft 173 which in turn is controlled by the cam 179 as described above. The clamp is in the form of an arm mounted on a shaft 182 affixed to one end of the arm. The shaft 182 is journaled in supports 183 and 184 mounted on the member 109, such that the clamp is pivoted for movement toward and away from the hollow support 42. A spring 185 is mounted on this shaft with one end fixed to one of the supports 184 and the other end fixed to the shaft such that the spring will tend to turn the shaft to urge the clamp 64 down upon the support 42. The clamp is held away from the support 42 by a cam 186 on the lowermost end of shaft 173. This cam, in the uppermost position of shaft 173 presses against a roller 187 mounted on the end of an arm 188 which is in turn fixed to the opposite end of shaft 182 from the clamp arm 64. Downward motion of the shaft 173 under control of the cam 179, represented by cam diagram A of Fig. 29, will move the cam 186 out of the way of the roller 187 to allow the spring 185 to swing the clamp unit counterclockwise and bring the clamp 64 into contact with the support 42.

The hollow cylinder 80 is mounted for vertical movement toward and away from the coil 40, as depicted in Figs. 10 and 12, in a combined bushing and air chamber 201 which, in turn, is fixedly supported by take-up plates 202 and 203 bolted to the disk 106. The cylinder 80 is controlled in this movement by a roller cam follower 204 mounted on a pin 205 secured to the lower end of the cylinder by a set screw 206. The roller is supported by and in continuous contact with a cam 207 fastened by screws 208 to the inner side of a cylindrical shell 209 surrounding the apparatus. The cam 207 corresponds to cam diagram D of Fig. 29. The combined bushing and air chamber 201 has a vertically extending air passage 211 which surounds the tube 80 along a portion of its length. A vacuum is applied to this passage through a tube 212 of a flexible material, such as rubber, attached to the bushing 201 by a screw connection 213. As shown in Fig. 1, the other end of the tube is attached to a rotatable portion 214 of a cylindrical manifold on the central shaft 101. The rotatable portion 214 of the manifold is connected to the cylinder 108 by a bar 215, such that this portion is fixed to the cylinder and rotatable therewith. The portion 214 is held against a corresponding fixed portion 216 of the manifold by a spring 217 on the shaft 101, which presses against a flange 218 fixed to the shaft. The fixed portion of the manifold is connected to a hollow passage in the shaft 101, which is in turn connected to a vacuum source, not shown, and contains an annular chamber which is in continuous contact with a similar chamber in the rotatable portion of the manifold, such that a vacuum is continuously applied to the air pasage 211 in the air chamber 201. The manifold may be adapted to service a number of units through a corresponding number of flexible tubes attached thereto. Ports 219 are provided to allow the vacuum to be applied from the air passage 211, through the ports, to the interior of the cylinder 80. The sequence in which the piston 84 covers and uncovers these ports to control the application of vacuum to the interior of the cylinder 80 will be described hereinafter. The cylinder 80 is prevented from rotating with respect to the air chamber 210 by a key 221 fixed to the air chamber, said key fitting in a corresponding keyway 222 in the side of the cylinder. This keyway allows full vertical movement of the cylinder 80 with respect to the air chamber.

The piston 84 slides up and down in the cylinder 80 under control of a roller cam follower 224 mounted on a pin 225 secured to the piston by a set screw 226. The follower 224 is supported by and in continuous contact with a cam 227 fastened to the inner surface of the cylinder 209 by screws 228. The shape of this cam corresponds to cam diagram C of Fig. 29. The piston 84 comprises a lower cylinder 229 of somewhat larger diameter than the portion which slides inside the cylinder 80. This cylinder slides in a bushing 231 held by take-up plates 232 and 233 bolted to the disk 105. This portion of the piston extends below the disk 105, as shown in Fig. 25a, to provide a chamber for the lower portion of the needle bar 96, as will be described in more detail hereinafter. The piston assembly is prevented from rotating with respect to the bushing 231 by a key 234 fixed to the bushing which fits in a corresponding keyway 235 in the cylinder portion of the piston 84. This keyway allows full vertical movement of the piston with respect to the bushing 231.

As generally described hereinbefore, the needles are extended and retracted by motion imparted to the rod 96 to which they are attached. The non-circular (hexagonal) rod 96 is integral with a circular rod 237 of slightly greater diameter which continues downward from the lower end of the rod 96. Additional vertical motion is imparted to the needle rod assembly 96 and 237 through the cam follower assembly shown in Figs. 25a, 27, and 28. This motion is relative to the motion of the piston 84 which carries the needle rods, in that these rods are carried by the piston 84 and move with it except during the short period when under control of the cam follower assembly, shown. This period is defined by the non-continuous cam 238 represented by cam diagram E of Fig. 29; the cam itself being attached to the inner surface of the shell 209 by screws 239. Relative motion is imparted to the rod 237 through a cam follower roller 241 rotatably mounted on an arm 242 which is slidably pivoted to an L-shaped arm 243 to lift the rod 237 through the pin 244. The cam rod 242, described, may comprise a double rod unit connected by a bar 245 at one end to provide a horseshoe-shaped structure which may be secured to opposite sides of the rod 237 as shown in Figs. 25a and 28. The needles 86 are slightly curved, as mentioned hereinbefore, and arranged on the rod 96 in a helical fashion such that they may adapt themselves to pass through the inclined holes 94 with a minimum of flexure as the needle carrying rod 96 is advanced to extend the needles.

The rod 96, supporting the needles, and the rod 237 extending therefrom are turned by a gear segment 246 fixed to the base 102 by a support, not shown. Rotative movement is imparted to the moving rod 237 when the teeth of a spur gear 247 on the end of the rod come into contact with the teeth of the aforesaid fixed gear segment. The spur gear 247 is positioned such that it will lie in the same horizontal plane as the gear segment 246 when the needles 86 are fully extended. The effective size and location of the gear segment is represented by cam diagram F of Fig. 29. For turning the needles, the piston 84 comprises an end portion 248 containing the holes 94, which is held to the hollow base of the piston by a snap-ring unit 249 for preventing the portion 248 from moving axially away from the rest of the piston. A sleeve 252, rotatably mounted in an upper hollowed-out portion of the piston, engages hexagonal rod 96 through a splined portion 253 therein. The splined portion 253 is so located that the sleeve 252 and the rod 96 will remain in engagement with one another at all positions of the unit. The rotative motion of the rod 96 is imparted to the end of the piston through the sleeve by a suitable connection, such as the key 255, between the sleeve and the end portion 248. Thus, identical rotative movement is imparted to the needles 86 and the holes 94 through the interconnections described above.

That portion of the string 30 extending between the spool 44 and the helical coil 40 is clamped for the operation of Fig. 16 by the string clamp 53, as generally described hereinbefore. This clamp comprises a pair of disks, one of which is urged against the other to provide the clamping force to hold the string between them. The disks are mounted on a rod 261 which is screwed into the member 109. The inner disk 262 is fixed to the rod 261 and the outer disk 263 is annular and slidable thereon. The outer disk is urged towards the inner disk by a spring 264 which is held on the rod by the nuts 265. The rod itself includes a hollow passage extending from its screw end to a point slightly beyond the inner disk 262 for accommodating a pin 266, movable therein. Rod 261 is split beyond the disk 262 to allow a plate 267, having a centrally disposed hole fitting over the rod and a cross piece 268 dividing the hole, to fit over it and slide into contact with the disk 263. The spring 264 then presses against the disk 263 through the plate 267, as shown in Fig. 22. The disks may be separated by pressing the pin 266 to the left in Fig. 21 through the hole in the annular disk 263 to contact the cross piece 268 and move the plate 267 and the spring 264 to the left to relieve the spring pressure against the disk 263. Normally the pin 266 is urged to the left by a spring 271 acting through the arm 272, which is pivotally mounted at 273 to the bracket 274 on the opposite side of the member 109. The spring 271 is stronger than the spring 264 in order to overcome the tendency of spring 264 to move the pin 266 to the right and bring the disks 262 and 263 into clamping contact. The rise on the cam 275 is calculated to contact the cam follower 276 to swing the pivot arm 272 clockwise, in the position shown, to oppose the spring 271 and allow the spring 264 to bring the disks 262 and 263 into clamping contact with one another. Cam 275, fixed to the central shaft 101 by the sleeve 277, corresponds to cam diagram J of Fig. 29.

The sequence of operation of the various parts of the automatic mechanism described may best be understood by referring to the cam diagrams of Fig. 29. Fig. 29 represents one complete cycle of operation, or one complete turn of one of the bag tying and knot forming units, described, around the central, vertical shaft 101. The mechanism of this invention is so timed that it will complete the forming of a bag and/or the tying of a knot of this invention in each cycle.

At the time of severance of the standing part 38 of the string and removal of the bag, represented by the line K—K in Fig. 29, the string end remaining comes under the influence of the suction pipe 46 positioned in way of the severing mechanism. The suction pipe then draws the string out under the coil 40 as shown in Fig. 4. Following removal of the bag, plunger 50 drops, as is represented by the dip 281 in cam diagram B, to minimize independent travel of the hook 48. Following this dip, the hook 48 is extended from the plunger, as indicated at 282 in cam diagram G. The hook is turned one full revolution during the period it's extended, as represented by the slope 283 in the cam diagram H, following which, it's retracted in the plunger and the plunger is raised to make way for insertion of the plate 60 carrying the gauze 62. This plate is fixed in position with respect to the rotative cycle and is represented roughly by the line M—M in Fig. 29. Immediately following movement of the unit past the plate 60, the shaft 173 begins to descend under control of the cam 179, as is represented by the dip 284 in cam diagram A. This movement is sufficient to allow the clamp 164 to close under the urging of the spring 185 as described hereinbefore. Almost simultaneously with, but slightly following, the clamp action, the plunger 50 again begins to descend, this time to enter the coil 40 to form the bag 66 with the gauze 62. The lowermost position of the plunger 50 is represented by the land 285 in cam diagram B of Fig. 29. Following its first downward motion, the shaft 173 descends further to lower the tube 68 to the position shown in Fig. 10 and represented by the point 286 in cam diagram A. Just prior to the time the tube 68 reaches the point 286, the piston 84 is lowered slightly under control of the cam 227 to expose the ports 219 in the walls of the cylinder 80 to place the interior of the cylinder under vacuum. This motion is represented by the small dip 287 in cam diagram C of Fig. 29. Following this dip, the piston 84 and the cylinder 80 rise together under control of their respective cams to a point designated 288 in cam diagram D of Fig. 29. At this point the cylinder 80 has reached its maximum point of upward travel while the piston 84 rests for a short period prior to its next movement. Then, the piston 84 begins to overhaul the cylinder 80 to close off the aforementioned vacuum and extend upward into the coil 40 and invert the bag 66. This motion and the corresponding dwell period of piston 84 in its uppermost position is represented by the land 289 in cam diagram C of Fig. 29. Just prior to the piston 84 reaching its uppermost position, the hook plunger 50 ascends out of the way of the piston, as is represented by the rise 291 in the cam diagram B. Next, the needles 96 are extended, as represented by the rise 292 in cam diagram E, to impale the inverted bag. Immediately following impaling on the needles, the clamp 64 is released, as represented by rise 293 in cam diagram A, to allow the needles to turn the inverted bag off the coil 40. The rotation of the needles under control of the gear segment 246 is represented by the raised portion 294 in cam diagram F. The needles are withdrawn after the rotation is completed, as is represented by the dip 295 in cam diagram E. The string clamp is actuated by the cam 275 to apply tension to the string 30, as represented by the raised portion 296 in cam diagram J of Fig. 29. Mechanism for grasping the end of the cord 36, represented by the jaws 90 and 92 in Figs. 15 and 16, and for severing the string ends, is positioned in the path of travel of the string ends approximately between the dip 295 and the line K—K in Fig. 29. This mechanism may be of the type described in copending applications Ser. No. 185,242/50, now Patent No. 2,725,102, and 312,132/52, now Patent No. 2,729,484 which define apparatus for clamping and cutting string ends from bags. Generally speaking, this mechanism clamps and cuts the string ends as the bag is dragged into contact therewith by the rotative movement of the bag forming and string tying unit.

While I have described this invention with reference to the apparatus embodied in the various figures of the drawings, it will be apparent to one skilled in the art that other apparatus may be used for performing the various operations described hereinbefore and that the apparatus shown in the drawings may be modified in many ways, without departing from the scope of the invention as defined in the following claims.

The invention claimed is:

1. The method of tying a cord about an object which consists in positioning a continuous cord having a free end in the form of a cylindrical helix having one or more turns, passing the free end of the cord around the turns and through the helix to form a loop surrounding the turns, placing an object to be tied within the helix either before or after the free end is passed through, unscrewing the loop from the helix and simultaneously drawing the cord linearly along the turns of the helix to reproduce about the object to be tied a free helical cord having one or more convolutions surrounded by a loop, and applying tension to the cord to tighten the convolutions about the object and to tighten the loop about the convolutions.

2. The method of forming and closing a bag which consists in positioning a continuous cord having a free end in the form of a cylindrical helix having one or more turns positively holding the cord in the helix thus formed, passing the free end of the cord around the turns and through the helix to form a loop surrounding the turns, drawing a sheet of flexible material over the helix to form a bag while holding said free end outside of the bag, placing the edges of the sheet within the helix to form an invert neck within the bag unscrewing the bag and the loop from the helix and simultaneously drawing the cord linearly along the turns of the helix thereby reproducing about the neck a free helical coil of cord having one or more convolutions surrounded by a loop, and applying tension to the cord to tighten the convolutions about the neck and to tighten the loop about the convolutions.

3. The method of making an absorbent body suitable for a surgical sponge which consists in forming a cord into one or more convolutions constituting an incipient knot, gathering a sheet of pervious absorbent material into a bag about the cord, tucking the edges of the sheet through the convolutions of the cord and into the bag thus formed and pulling the cord to tighten the knot.

4. The method of making an absorbent body suitable for a surgical sponge which consists in forming a cord into one or more convolutions constituting an incipient knot having a free end, folding a sheet of pervious absorbent material to form a sheet having a folded edge, gathering the sheet into a bag about the cord while folding the folded edge over the free end, tucking the edges of the sheet through the convolutions and into the bag thus formed and pulling the cord to tighten the knot.

5. The method of makin an absorbent body suitable for a surgical sponge which consists in forming a cord into one or more convolutions constituting an incipient knot having a free end, folding a sheet of pervious absorbent material to form a sheet having a folded edge, gathering the sheet into a bag about the cord while folding the folded edge over the free end, filling the bag with absorbent material, tucking the edges of the sheet through the convolutions and into the bag and pulling the cord to tighten the knot.

6. A flexible sheet having an edge, the sheet being gathered into a bag having a re-entrant neck disposed within the bag, the entire edge of the sheet being disposed within the bag and a cord closing the bag, the cord being wound about the neck within the bag and tied in a knot.

7. A flexible sheet having an edge, the sheet being gathered into a bag having a re-entrant neck disposed within the bag, the entire edge of the sheet being disposed within the bag, and an inextensible cord closing the bag, the cord being wound about the neck within the bag and tied in a knot.

8. An absorbent body suitable for a surgical sponge comprising in combination a flexible sheet having an edge, the sheet being folded to provide an area of double thickness, the sheet being gathered into a bag having a re-entrant neck and the portion of double thickness being folded to provide a slit opening into the bag, the entire edge of the sheet being disposed within the bag, and a cord closing the bag, the cord being coiled around the neck and knotted, the coils and knot being disposed within the bag, and the cord having at least one free end passing from the knot through said slit.

9. An absorbent sponge comprising in combination an originally flat sheet having a central portion gathered into a bag, a second portion which surrounded the central portion in the flat formed into a re-entrant neck within the bag, and an edge portion which surrounded the second portion in the flat and disposed within and filling the bag, and a cord coiled around the neck and knotted to close the bag, the coil and knot of the cord being disposed wholly inside the bag.

10. An absorbent sponge comprising in combination an originally flat sheet having a central portion gathered into a bag, a second portion which surrounded the central portion in the flat formed into a re-entrant neck within the bag, and an edge portion which surrounded the second portion in the flat and disposed within and filling the bag, and a cord coiled around the neck and knotted to close the bag, the cord being disposed between the neck and said central portion.

11. An absorbent body suitable for a surgical sponge comprising in combination a flexible sheet having a central portion gathered into a bag having a re-entrant neck, one edge of the sheet being folded to provide a slit opening into the bag, the remainder of the sheet being disposed within the bag, and a cord closing the bag, the cord being coiled around the neck and knotted, the coils and knot being disposed within the bag, and the cord having at least one free end passing from the knot through said slit.

12. A flexible sheet having an edge, the sheet being gathered into a bag having a re-entrant neck disposed within the bag, the entire edge of the sheet being disposed within the bag, absorbent material filling the bag and a cord closing the bag, the cord being wound about the neck within the bag and tied in a knot.

13. A tie forming and knotting device comprising in combination means for positively holding a flexible cord having a free end in a coil having one or more convolutions, means for passing the free end around the convolutions and through the coil to form a loop around all the convolutions, means for placing an object to be tied within the coil, means for releasing the coil and means for applying tension to the cord to tighten the convolutions about the object and to tighten the loop about the convolutions.

14. A knot forming and tying device comprising in combination a tube formed into a cylindrical helical coil having one or more convolutions and adapted to have a cord having a free end threaded through the tube, means for drawing the free end of the cord over the convolutions and through the coil to form a loop about the convolutions of the coil, means for positioning an object to be tied within the coil, means for rotating the loop about the axis of the coil to unscrew the loop from the coil and produce on the object a number of turns of cord corresponding to the number of convolutions of the coil, all of said turns being surrounded by the loop, and means for applying tension to the cord to tighten the convolutions about the object and tighten the loop about the convolutions.

15. In a bag forming and tying device the combination of means for holding a cord coiled in the form of a cylindrical helix having one or more convolutions, means for drawing a cord linearly along the convolutions, including means for passing the end of the cord axially through the convolutions, to form a loop surrounding all the convolutions, means for folding a sheet over the holding means to form a bag, and means for unscrewing the bag from the helix.

16. In a bag forming and tying device the combination of means for holding a cord coiled in the form of a cylindrical helix having one or more convolutions, means for drawing a cord linearly along the convolutions, including means for passing the end of the cord axially through the convolutions, to form a loop surrounding all the convolutions, means for folding a sheet over the holding means to form a bag, means for unscrewing the bag from the helix, and means for applying tension to the cord to tighten the convolutions about the bag and tighten the loop about the convolutions.

17. In a bag forming and tying device the combination of means for holding a cord coiled in the form of a cylindrical helix having one or more convolutions, means for drawing a cord linearly along the convolutions, including means for passing the end of the cord axially through the convolutions, to form a loop surrounding all the convolutions, means for folding a sheet over the holding means to form a bag, means for tucking the edges of the sheet into the holding means to form a re-entrant neck within the convolutions and inside the bag, and means for unscrewing the bag from the holding means to produce about the neck convolutions of cord corresponding to the convolutions of the helix and a loop surrounding the convolutions of cord.

18. In a bag forming and tying device the combination of means for holding a cord coiled in the form of a cylindrical helix having one or more convolutions, means for drawing a cord linearly along the convolutions, including means for passing the end of the cord axially through the convolutions, to form a loop surrounding all the convolutions, means for folding a sheet over the holding means to form a bag, means for tucking the edges of the sheet into the holding means to form a re-entrant neck within the convolutions and inside the bag, means for unscrewing the bag from the holding means to produce about the neck convolutions of cord corresponding to the convolutions of the helix and a loop surrounding the convolutions of cord, and means for applying tension to the cord to tighten the convolutions about the neck and the loop about the convolutions.

19. In a bag forming and tying device the combination of a tube formed into a cylindrical helical coil having one or more convolutions and adapted to have a cord passed linearly through the tube, means for drawing the cord through the tube, means for positioning the free end of the cord across the diameter of the coil, a hook, means for passing the hook through the coil to draw the free end of the cord axially through the coil to form a loop surrounding said convolutions, means for holding the free end of the cord, means for positioning a flexible sheet over the coil, a plunger adapted to enter the coil, means for positioning the plunger within the coil for forming a portion of the sheet into a bag, a tube adapted to be passed axially along the coil and outside of the coil to gather the material of the sheet into a neck, means for reversing the bag and for inserting the neck into the bag, means for unscrewing the bag and the loop from the helical coil to produce about the neck a coil of cord having one or more convolutions surrounded by a loop, and means for applying tension to the cord to tighten the convolutions about the neck and tighten the loop about the convolutions.

References Cited in the file of this patent

UNITED STATES PATENTS 1,726,060    Doble _____ Aug. 27, 1929

OTHER REFERENCES

"Encyclopedia of Knots," by Graumont and Hensel, published by Cornell Maritime Press (1945). A copy is in Div. 5 of the Patent Office, page 15, plate 2-Hitches, illustrations 32.

Day: "The Art of Knotting and Splicing," 1947, pages 100–101, Figures 102A, 102B. Copy in Scientific Library.